May 28, 1929.  H. B. STAVER  1,715,254
STARTING BOX
Filed June 30, 1927   2 Sheets-Sheet 1
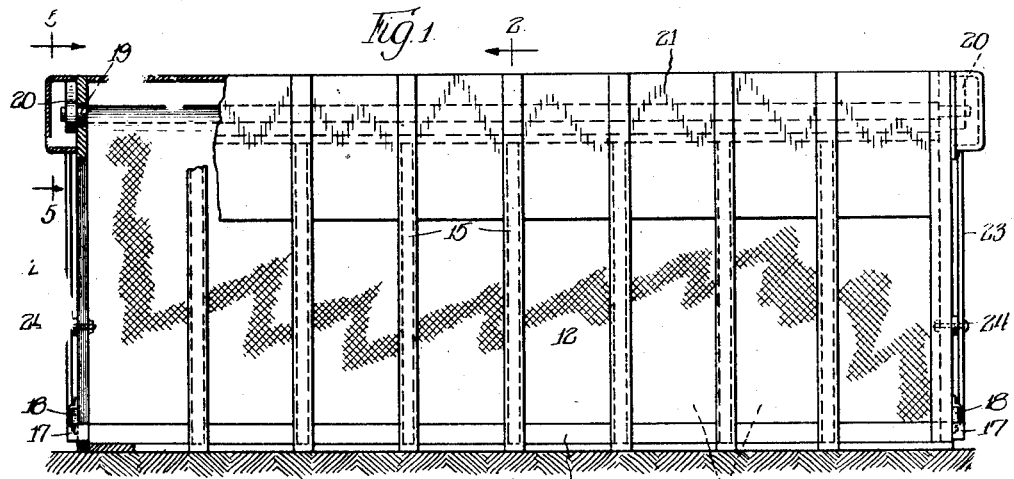
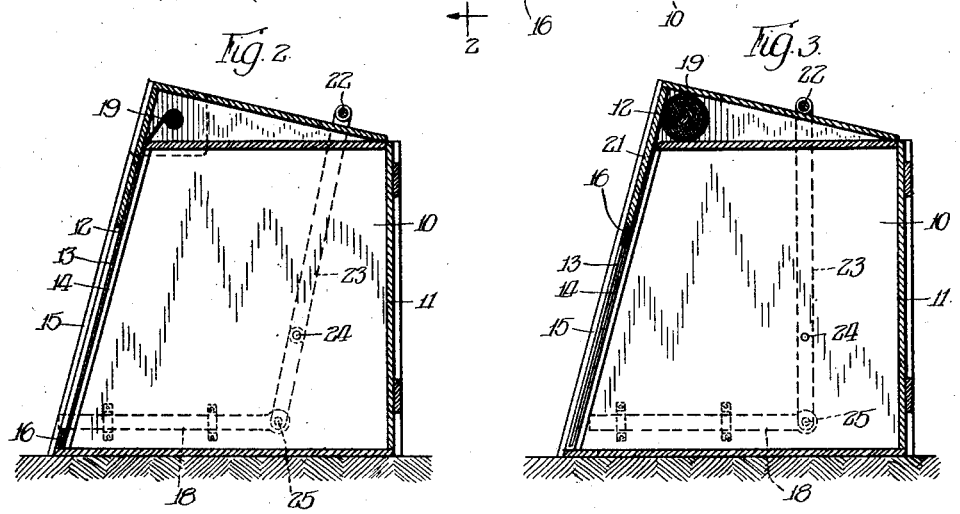
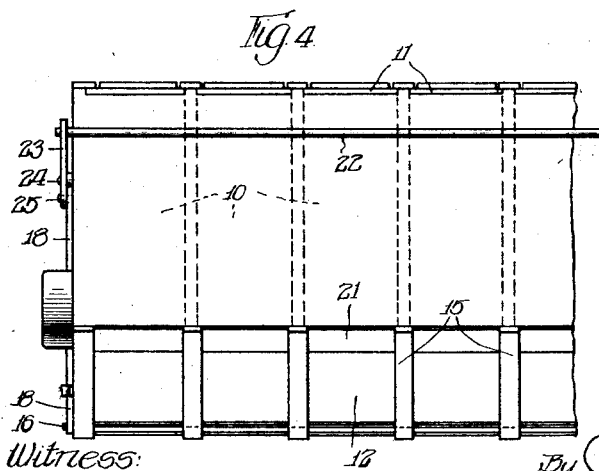
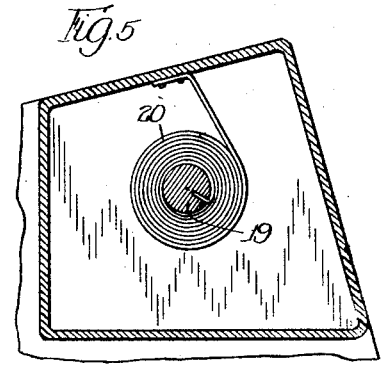
Inventor:
Harry B. Staver,
By Cromwell, Grist & Warden
Attys
Witness:
R. Burkhardt

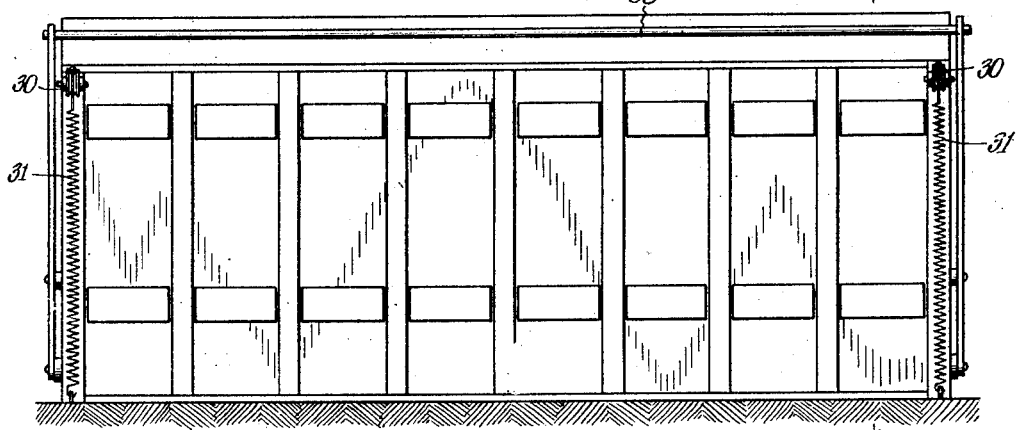
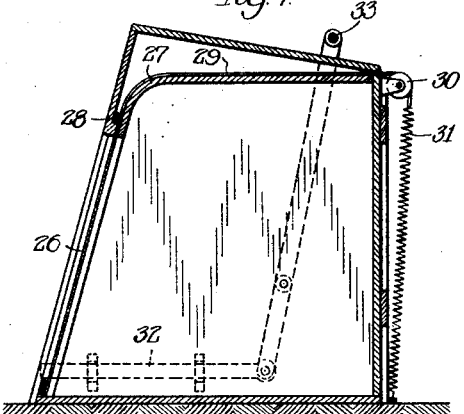
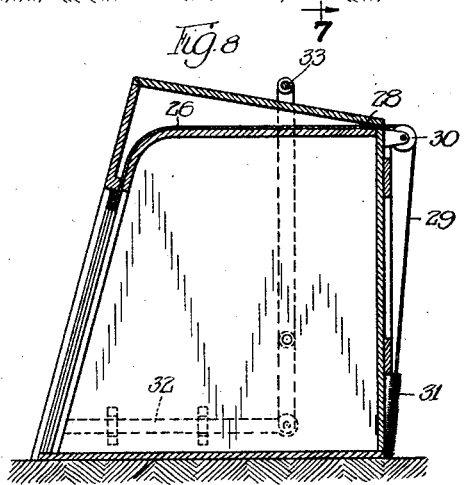
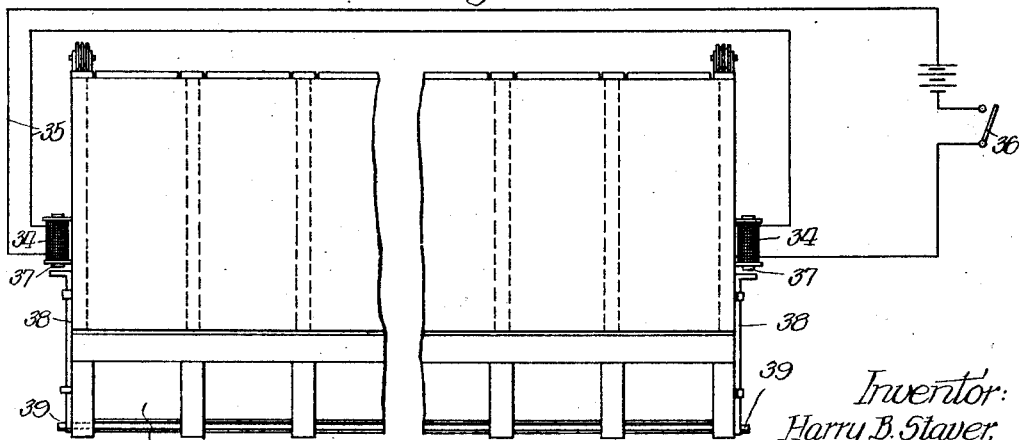

Patented May 28, 1929.

1,715,254

UNITED STATES PATENT OFFICE.

HARRY B. STAVER, OF CHICAGO, ILLINOIS.

STARTING BOX.

Application filed June 30, 1927. Serial No. 202,498.

This invention has to do with dog racing apparatus, and is particularly concerned with improvements in the starting boxes from which all of the dogs are released simultaneously at the commencement of a race.

The object of the invention is to provide an improved starting box in which the front ends of the stalls for the dogs are closed by a curtain which can be raised instantaneously into an unobstructive position wherein it is not in the way and is quite inconspicuous.

Other objects and advantages of the invention will be evident upon a full understanding of the construction and operation of the improved starting box.

Two different forms of the invention are presented herein for the purpose of exemplification, but it will of course be appreciated that the invention is susceptible of embodiment in other forms coming equally within the scope of the claims.

In the drawings:

Fig. 1 is a front view of a starting box embodying one form of the invention;

Fig. 2 is a transverse section through the box, taken on the line 2—2 of Fig. 1, showing the curtain in closed position;

Fig. 3 is a similar section, showing the curtain in raised position;

Fig. 4 is a fragmentary plan view of the box;

Fig. 5 is a transverse section through one of the spring housings, taken on the line 5—5 of Fig. 1;

Fig. 6 is a rear view of a starting box embodying another form of the invention;

Fig. 7 is a transverse section through the box, taken on the line 7—7 of Fig. 6, showing the curtain in closed position;

Fig. 8 is a similar section, showing the curtain in raised position; and

Fig. 9 is a fragmentary plan view of the box shown in Figs. 6, 7 and 8, equipped with a remote control by means of which the curtain may be released from some distant point, such as the judges' stand.

Referring first to Figs. 1 to 5 inclusive, it will be observed that the starting box shown therein is characterized by a row of stalls 10. The rear ends of the stalls are closed by individual doors 11, while the front ends are closed by a flexible curtain 12. The curtain travels in inclined slots 13 which are formed between the front edges 14 of the partitions separating the stalls and guide strips 15 in forwardly spaced relation to such edges. The bottom of the curtain is secured to a reinforcing strip 16, the ends 17 of which project slightly beyond the ends of the curtain for cooperation with retractable latching members 18. The top of the curtain is secured to a roller 19 which is journaled in the box above the stalls. Two springs 20 are connected with the ends of the roller for causing the same to turn and roll the curtain up thereon the instant the latching members 18 are retracted, and the extent to which the bottom of the curtain will be raised is limited by stops 21 in the tops of the slots 13. The roller 19, instead of being mounted above the stalls, may be positioned in front of the same just above the stops 21, thus materially reducing the size of the curtain.

The latching members 18 are retracted in unison from positions overlying the ends 17 of the strip 16 by means of an operating handle 22. The handle 22 is a long rod which extends horizontally from one end of the box to the other end and is connected with the upper ends of two vertical levers 23. The levers 23 are pivoted at 24 to the ends of the box, and are pivoted at 25 to the rear ends of the latching members 18. When the handle 22 is shifted forwardly, the latching members 18 will be withdrawn from engagement with the ends of the strip 16, and the curtain will snap up instantly, from the position shown in Fig. 2 to that shown in Fig. 3.

In the modification shown in Figs. 6 to 8 inclusive, the curtain 26, instead of winding up on a spring roller housed within the upper portion of the box, shifts along the curved upper surface 27 of the top into a substantially horizontal position over the same. The top of the curtain is secured to a reinforcing rod 28, and two or more cables 29 are attached to such rod at spaced points. The cables 29 extend rearwardly over pulleys 30, and then downwardly, where they connect with springs 31. When the latching members 32 are withdrawn by the handle 33 to release the bottom of the curtain, the springs 31, acting through the cables 29, will shift the curtain instantly from the position shown in Fig. 7 to that shown in Fig. 8, the shifting of the curtain being somewhat like the movement of the cover on a roll-top desk.

In Fig. 9, a starting box such as that shown in Figs. 6 to 8 inclusive, is provided with a remote control, either in place of, or supplementary to, the operating handle 33. The remote control may consists of two solenoids 34, which are connected in series in an electrical circuit 35. When the circuit is closed by the manipulation of a suitable switch 36 located at some distant point, such as the judges' stand, the cores 37 of the solenoids will be energized and will withdraw the latching members 38 out of engagement with the ends 39 of the reinforcing strip along the bottom of the curtain 40, thereby releasing the curtain and permitting the same to open.

The flexible curtain used in connection with a starting box embodying the invention may be made of canvas or other suitable fabric, or may be made of non-flexible slats flexibly joined together.

I claim:

1. In a starting box for dogs, a row of stalls, a flexible curtain closing the front ends of the stalls, a rigid member associated with the curtain adjacent the lower edge of the same for preventing such edge from being bowed outwardly away from the front ends of the stalls, means tending to raise the curtain instantaneously into a flexed unobstructive position above the stalls when the curtain is released, and latching means in readily detachable engagement with the curtain adjacent the lower edge of the same for preventing the curtain from raising.

2. In a starting box for dogs, a row of stalls, a flexible curtain positioned at an inclination for closing the front ends of the stalls, a spring roller to which the top of the curtain is secured, a reinforcing strip to which the bottom of the curtain is secured, and retractable latching members engaging with the ends of the reinforcing strip beyond the ends of the curtain for normally holding the same in closed position.

3. In a starting box for dogs, a row of stalls, a flexible curtain closing the front ends of the stalls, means for preventing the lower edge of the curtain from being bowed forwardly away from the front ends of the stalls, means tending to raise the curtain quickly when released, and latching means in readily retractible engagement with said first-mentioned means for preventing the curtain from raising.

4. In a starting box for dogs, a row of stalls, a flexible curtain for closing the front ends of the stalls, means tending to raise the curtain quickly when released, a rigid strip to which the bottom of the curtain is secured, and retractible latching members engaging with the strip to hold the curtain down.

In testimony whereof I have hereunto subscribed my name.

HARRY B. STAVER.